Feb. 6, 1962 W. G. CHARLEY ET AL 3,019,575
APPARATUS FOR INSERTING STRAWS OR THE LIKE
Filed Feb. 13, 1959 5 Sheets-Sheet 1
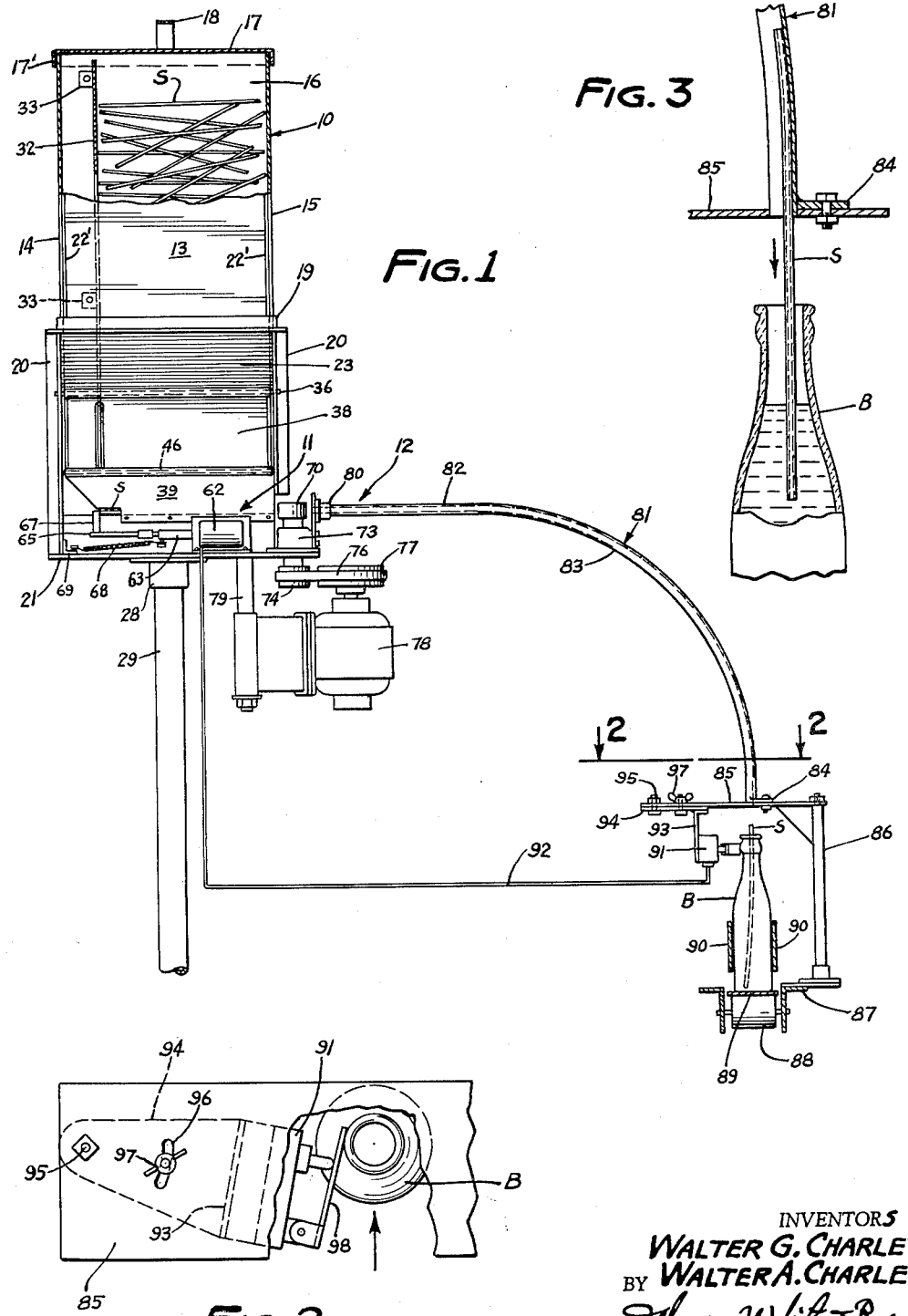
INVENTORS
WALTER G. CHARLEY
BY WALTER A. CHARLEY
Moore, White & Burd
ATTORNEYS

INVENTORS
WALTER G. CHARLEY
BY WALTER A. CHARLEY

Moore, White & Burd
ATTORNEYS

Feb. 6, 1962 W. G. CHARLEY ET AL 3,019,575
APPARATUS FOR INSERTING STRAWS OR THE LIKE
Filed Feb. 13, 1959 5 Sheets-Sheet 3

INVENTORS
WALTER G. CHARLEY
BY WALTER A. CHARLEY

Moore, White & Burd
ATTORNEYS

Feb. 6, 1962 W. G. CHARLEY ET AL 3,019,575
APPARATUS FOR INSERTING STRAWS OR THE LIKE
Filed Feb. 13, 1959 5 Sheets-Sheet 4
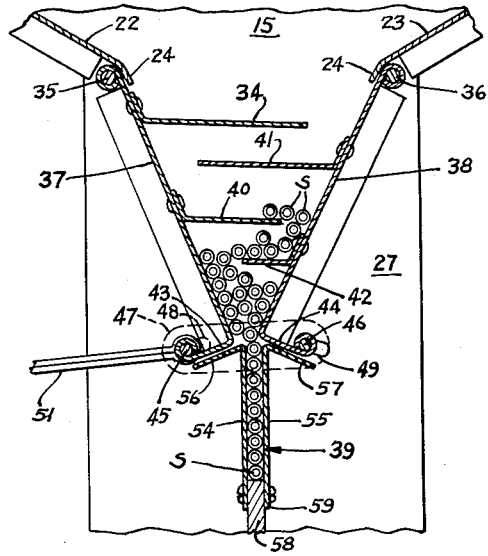
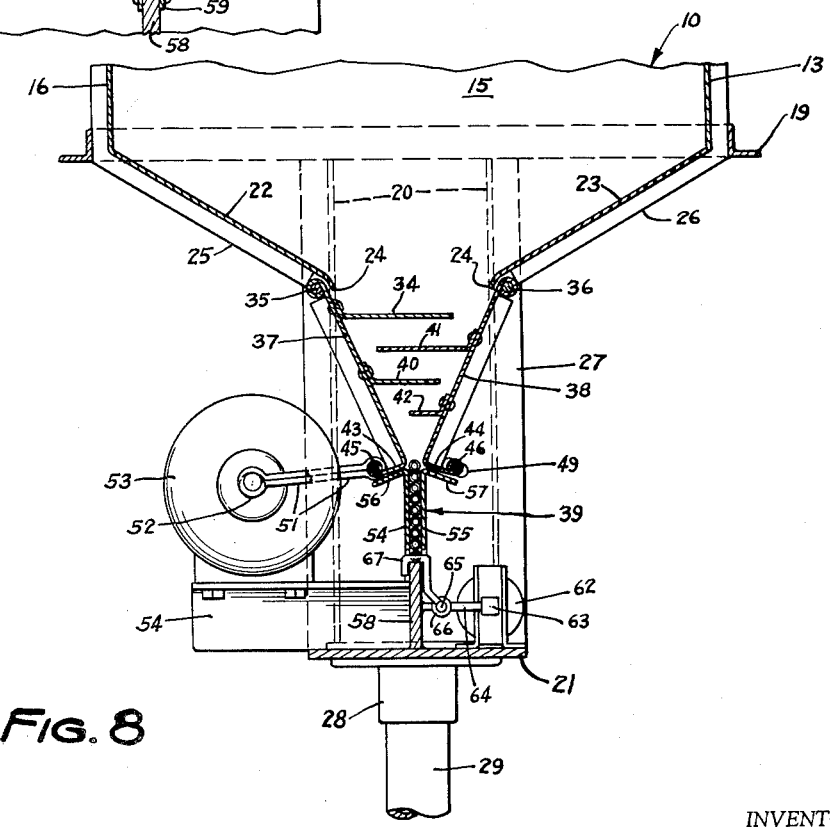
INVENTORS
WALTER G. CHARLEY
BY WALTER A. CHARLEY
Moore, White & Burd
ATTORNEYS Feb. 6, 1962 W. G. CHARLEY ET AL 3,019,575
APPARATUS FOR INSERTING STRAWS OR THE LIKE
Filed Feb. 13, 1959 5 Sheets-Sheet 5

INVENTORS
WALTER G. CHARLEY
BY WALTER A. CHARLEY
Moore, White & Burd
ATTORNEYS

# United States Patent Office 3,019,575
Patented Feb. 6, 1962

3,019,575
APPARATUS FOR INSERTING STRAWS
OR THE LIKE
Walter G. Charley and Walter A. Charley,
La Crescent, Minn.
Filed Feb. 13, 1959, Ser. No. 793,091
9 Claims. (Cl. 53—59)

This invention relates to new and useful improvements in apparatus for inserting straws or the like into receptacles and more particularly to apparatus for automatically placing drinking straws in bottles of goods intended for human consumption during the filling process.

The structure of this invention comprises three basic assemblies: a hopper assembly for containing a supply of straws, generally designated 10; a timing-transfer assembly for timed sequent delivery of straws from the hopper assembly to an injection assembly, generally designated 11; and an injection assembly or feeding device for delivering the straws into the containers or bottles, generally designated 12.

The hopper assembly consists of a suitable receptacle provided with an agitating means to insure proper alignment of the straws and their delivery, one at a time, to the timing-transfer assembly. The timing-transfer assembly consists of a suitable solenoid or the like arranged to push the lowermost straw from the reservoir portion of the hopper through a distance sufficient to deliver it to the injection means or assembly after which the solenoid is returned to its initial position ready for the next straw, the control of the solenoid being accomplished by sequentially transported bottles into which straws are to be inserted.

The feeding or injection assembly or device comprises a pair of feed rollers arranged to receive straws in succession from the injection means and deliver the straws through a suitable guide in the bottle into which the straw is to be inserted.

It is therefore an object of this invention to provide a new and useful apparatus for inserting straws or the like into bottles or the like.

A further object of this invention is to provide a new and useful hopper structure in an apparatus in an inserting apparatus.

Still a further object of this invention is to provide a new and useful injection means in an insertion apparatus.

Still a further object of this invention is to provide a new and useful timing means for controlling sequent insertion.

Still a further object of this invention is to provide a new and useful apparatus for inserting straws into bottles comprising a hopper means, timing and transfer means for receiving straws therefrom and delivering them to an injection means and injection means for inserting the straws into bottles.

Yet a further object of this invention is to provide a new and useful hopper structure for supporting a plurality of straws or the like, said hopper means having means whereby straws of different lengths may be utilized.

A still further object of this invention is to provide a new and useful agitating means in a delivery hopper.

Yet a further object of this invention is to provide a new and useful mechanism for individually and sequentially transferring straws from a hopper into an injection means.

Still a further object of this invention resides in the provision of an injection means comprising feed roller means and a cooperating guide structure.

Yet a further object of this invention resides in the control of means for receiving straws from a hopper and for transferring the straws so received into an injection means, the control means being adjustable so as to be actuatable in a plurality of positions by engagement with the bottle into which the straw is to be inserted.

A further object of this invention resides in the structural features of the hopper assembly, the structural features of the timing-transfer assembly and the structural features of the injection assembly.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the twelve figures of the drawings in which corresponding numerals refer to the same parts and in which:

FIGURE 1 is an end elevational view, partly broken away, of the instant invention;

FIGURE 2 is a fragmentary view, partly broken away, taken along the line and in the direction of the arrows 2—2 of FIGURE 1;

FIGURE 3 is a fragmentary vertical sectional view of the guide tube of the invention showing a straw being inserted into a bottle;

FIGURE 7 is a vertical sectional view of the hopper agitating means of the invention;

FIGURE 8 is a similar view on a reduced scale and showing the agitating means in a second position;

Figure 4:
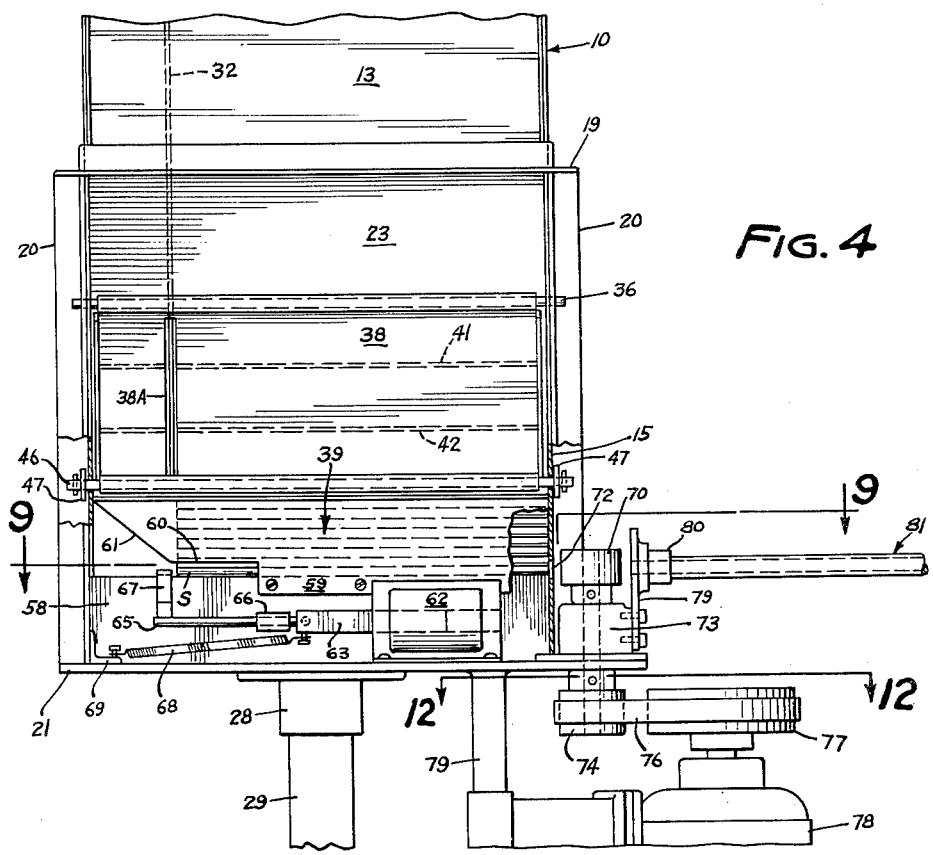
FIGURE 4 is a fragmentary side elevational view on an enlarged scale, partially broken away to show a straw in the ready or preactuation position of the timing-transfer assembly.

Reference is now made to the drawings and specifically to FIGURE 1. There the hopper assembly 10 is shown as comprising a hopper, generally rectangular in horizontal cross-section, having a plurality of vertical walls 13–16 joined at their edges by any suitable means. The walls are planar and each terminate in the same horizontal plane at their upper edge to receive a cap or lid 17 provided with a handle 18 by which it may be removed. The lid 17 is provided with a depending flange 17' which positions it as shown in FIGURE 1 on the hopper.

The four hopper walls are each supported by and secured to an external flange comprised of angle members 19, in turn supported by a plurality of upright angle members 20 secured to a base plate 21.

As will be appreciated by inspection of FIGURE 1, walls 14 and 15 are flat plate or planar members. Walls 13 and 16 are similar throughout the major portion of their extension but have outwardly turned edges 22' in abutment with and secured to and interior of the corresponding vertical edges of walls 14 and 15.

Walls 13 and 16 are each provided with an inwardly declined portion 22 and 23 as shown in FIGURE 8. Portions 22 and 23 terminate at arcuate edges 24 in a common plane.

Walls 14 and 15 have a bottom portion providing inwardly declined edges 25 and 26, in turn joined to a depending rectangular portion 27. Two of the upright angle members 20 are positioned one at either edge of the rectangular portion 27 in vertical extension as shown in FIGURE 8.

The base plate 21 is suitably secured to a cap flange 28 positioned on standard 29 which may be secured to any supporting surface to hold up the aforedescribed structure.

Interior of the hopper 10 is a removable baffle 32 secured thereto by tabs 33, bolted or otherwise secured to walls 13 and 16. The baffle provides a false wall so that straws S of the length shown in FIGURE 1 may be inserted. It is removable so that straws extending the full length of the hopper, between walls 14 and 15, may be used if desired.

Supported in corresponding uprights 20 adjacent the edges 24 of walls 16 and 13 respectively are pivot rods 35 and 36, each of which supports a hinged member or door, 37 and 38 respectively. The hinged members or doors 37 and 38 provide an agitating means to insure proper alignment of the straws for delivery to the reservoir 39 and thus to the timing-transfer mechanism. The doors 37 and 38 are arranged longitudinally of the bottom of the hopper between the rectangular portions of walls 14 and 15 in the form of a V, suitably separated at their bottom to permit the straws S to fall through. Note the spacing in FIGURE 8. Each of these doors is provided with a rolled edge at its top, positioned on its respective pivot rod, and flanges along its generally vertical edges. Each of these doors is provided with a suitable number of horizontal baffles or ledges, shown for member 37 as ledges 34 and 40 and for member 38 as ledges 41 and 42. The ledges are riveted or otherwise secured to the doors.

As will be appreciated, ledges 41, 40 and 42 are progressively of lesser extension because of the V configuration provided by the doors 37 and 38. The doors 37 and 38 are each provided with an aperture for accommodation of the baffle 32 only one of which, 38A, is shown in FIGURE 4.

Means is provided to cause the doors or members 37 and 38 to vibrate or move arcuately about their hinges or pivots 35 and 36 through a small angle. Such means is shown as comprising bottom flanges 43 and 44 each provided with a rolled edge having a rod, 45 and 46 respectively, therein. Rods 45 and 46 are each secured to end plates 47 and penetrate arcuately but oppositely disposed slots 48 and 49 in each of walls 14 and 15 (FIGURE 7). Each end of the rods is provided with a cotter key 50 or other suitable means for securing it in position in apertures of the plates 47.

Rod 45 has joined thereto a pair of links 51 each of which is joined to the offset end of a shaft 52 of motor 53. Motor 53 is mounted upon a bracket 54 secured to plate 21.

Thus, the motor 53 through the eccentric or offset ends of shaft 52 and links 51 drives rod 45 for arcuate movement in its slot and through connectors 47 similarly drives rod 46. Doors 37 and 38 thus vibrate in unison about their pivots.

Immediately below the bottom of the V formed by doors 37 and 38 is the reservoir 39 in which the straws arrange themselves one above the other in vertical stack and from which they are fed by the timing-transfer mechanism to the injection means and thence into bottles B, one of which is shown in position in FIGURE 1.

Figure 5:
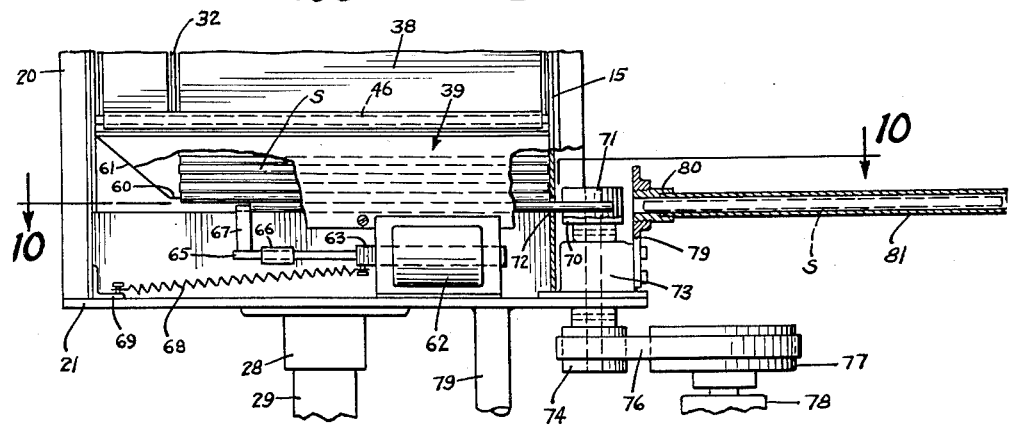
FIGURE 5 is a fragmentary view showing the timing-transfer assembly in delivery or ejection position and similar to FIGURE 4.
Figure 6:
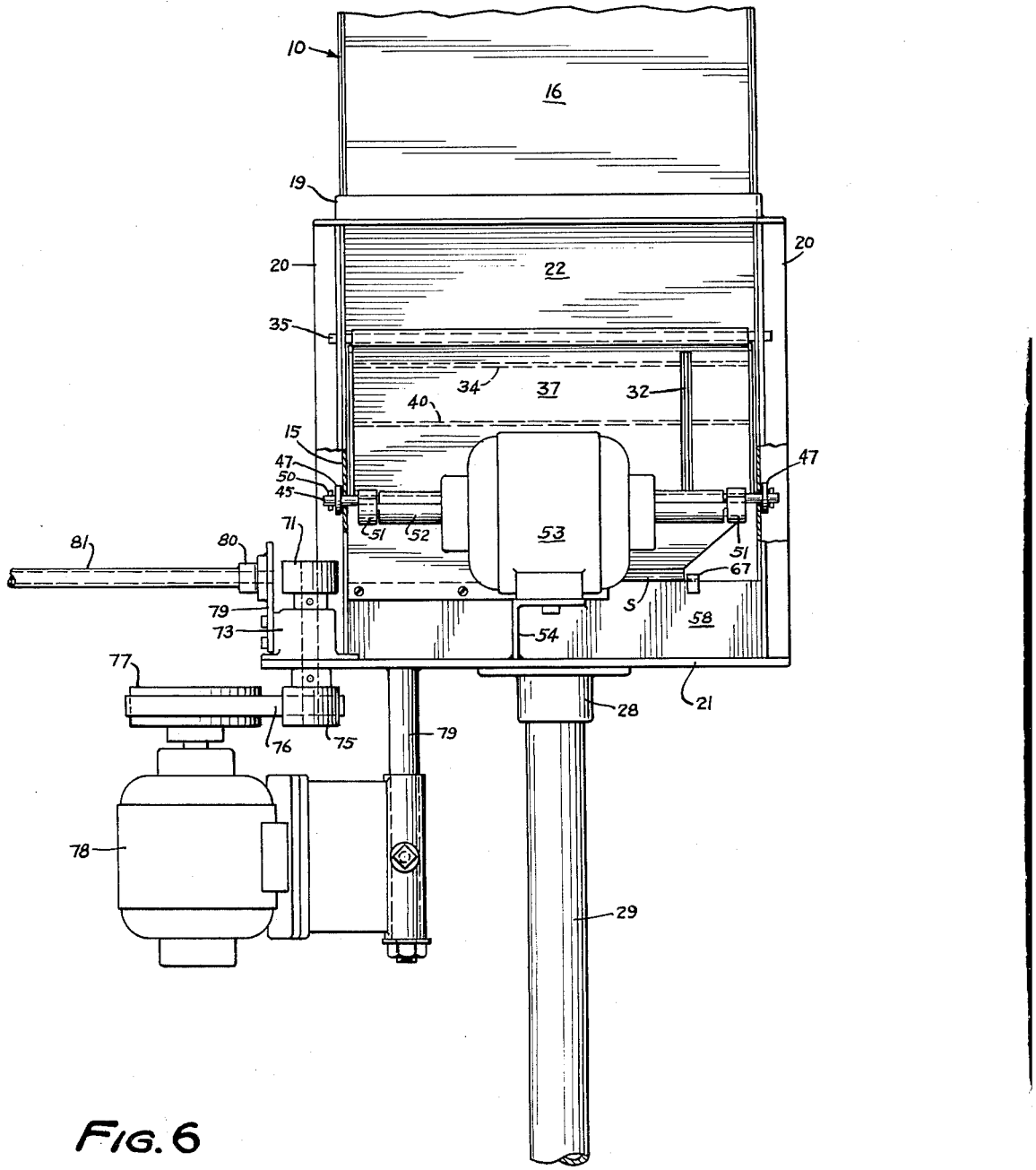
FIGURE 6 is a fragmentary rear elevational view of the invention.

The reservoir 39 comprises a pair of horizontally positioned spaced apart vertical plates 54 and 55 having outwardly declined flanges 56 and 57 cooperating with flanges 43 and 44 respectively. The plates 54 and 55 terminate over the vertical guide block 58 on which the lowermost straw of the stack rests. The plates 54 and 55 are bolted or otherwise secured thereto throughout their portion 59 and each has an upwardly offset portion 60 and an inclined portion 61 as best seen in FIGURE 4. The opposite edges each abut wall 15 which is provided with an aperture 72 above block 58 to permit exit of the lowermost straw in the stack as shown in FIGURES 5 and 9.

The timing-transfer assembly 11 includes a solenoid 62 positioned on plate 21 and having its plunger 63 connected by a rod 64 to a pusher bar rod 65 through adjustable connection or collar 65A. Rod 65 is slidable in bearings 66 secured to the upstanding plate 58. To the end of the member 65 is secured the pusher bar 67 which has a downwardly U-shaped configuration best shown in FIGURE 8 to ride on the top surface of member 58.

Figure 9:
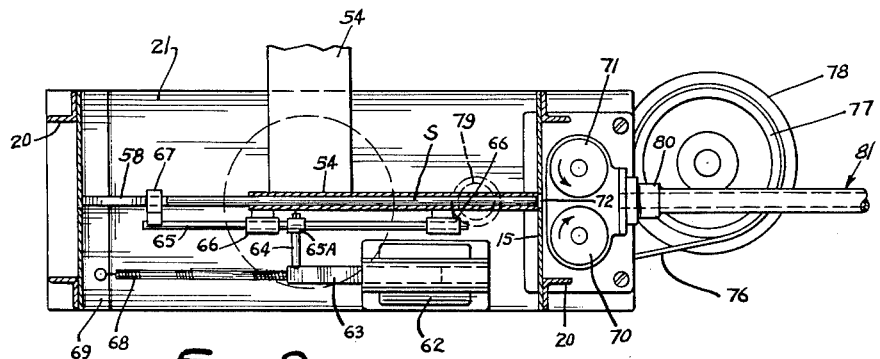
FIGURE 9 is a horizontal sectional view taken along the line and in the direction of the arrows 9—9 of FIGURE 4.
Figure 10:
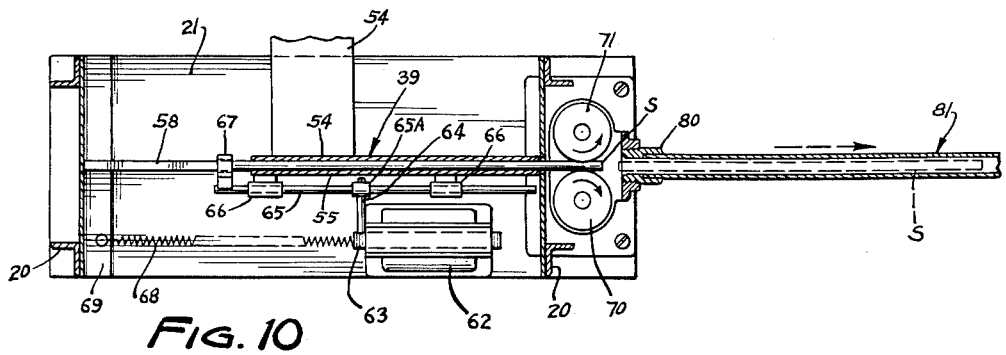
FIGURE 10 is a similar view taken along the line and in the direction of the arrows 10—10 of FIGURE 5.

As shown in FIGURES 9 and 10 the solenoid actuates when energized to deliver the lowermost straw in the stack from the position of FIGURE 9 to that of FIGURE 10 whereupon it is engaged by the feed rollers. Upon de-energization of the solenoid, it will be returned by the spring 68 secured to it and by angle lug 69 to the plate 21.

Figure 12:
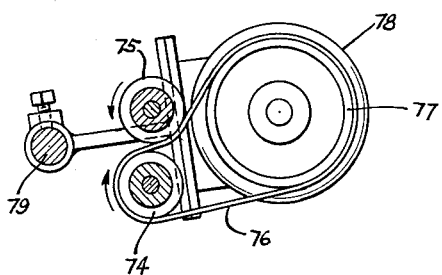
FIGURE 12 is a view taken along the line and in the direction of the arrows 12—12 of FIGURE 4.

Positioned at the extending end of the plate 21 is a pair of feed rollers 70 and 71 forming a part of the injection assembly. The rollers 70 and 71 are positioned to receive the lowermost straw as it is fed from the position of FIGURES 1 and 9 to the position of FIGURE 10 through the aperture 72 in the wall 15. Rollers 70 and 71 are each journalled in common bearing 73 and having extending roller sheaves 74 and 75 respectively which are driven in the direction of the arrows of FIGURE 12 by belt 76 passed around sheave 77 of motor 78. Rollers 70 and 71, as shown, have smooth right cylindrical surfaces, but they could be grooved, knurled, etc.

The direction of rotation of rollers 74 and 75 and consequently of rollers 70 and 71 is such as to cooperate with the movement of the straw from the reservoir or in a rightwardly direction with reference to FIGURES 1 and 4.

The motor 78 is supported by bracket 79 from plate 21. It is operated continuously from a suitably source of electric current so that the rollers 70 and 71 are continually rotating when the machine is in operation. Likewise motor 53 is operated continuously so that doors 37 and 38 are constantly vibrating. Suitable switch controls, not shown, are provided for the motors.

Secured by an upright 79 to bearing 73 is a nipple 80 attached to a guide tube or member 81 which serves to guide the straw into the bottle. The guide tube 81 extends as shown in FIGURE 1 and in this illustrative embodiment is of stiff metal. It comprises a tubular section throughout portion 82 but a U-shaped portion from point 83 to its terminal end, providing a downwardly and inwardly directed chute as shown in FIGURE 1. At its terminal end it is secured by flange 84 to terminal plate 85 in turn supported from upright 86 secured to the frame 87 of the bottle conveyor being used. The frame 87 of the bottle conveyor supports a plurality of rollers 88 in turn supporting the upper run 89 of a suitable belt upon which the bottles B are supported and rest during their travel. The conveyor is provided with upright members 90 forming a suitable bottle guide. The bottle conveyor is conventional and will not be further described in detail as it forms no part of this invention per se. The plate 85 could be otherwise supported if desired.

The plate 85 is apertured as shown in FIGURE 3 to permit the passage or penetration of the straw and the terminal end of the tube 81 is positioned in that aperture.

As is perhaps best shown in FIGURE 1, a solenoid switch 91 connected via lines 92 to solenoid 62, is supported by a depending member 93 in turn joined to a pivoted plate 94. Plate 94 is pivoted to plate 85 about pivot 95. An arcuate slot 96 is provided in plate 85 and a wing nut assembly 97 secured to plate 94 and positioned therein permits adjustment (upwardly and downwardly with reference to FIGURE 2) or forwardly and rearwardly with reference to the direction of travel of bottle B shown by the arrow in FIGURE 2. The switch is provided with a trip lever 98 pivoted thereto and adapted to be engaged by the top of the bottle as it passes along the upper run 89 of its conveyor for energizing the solenoid 62.

Thus, as will be appreciated with reference to FIGURE 2, the switch can be adjusted for precise engagement by the bottle as it passes through the conveyor for properly timed actuation of the solenoid and thus feeding of the straws.

In operation the straws S are placed in random but generally longitudinal orientation in the hopper assembly 10 as shown in FIGURE 1. The lid 17 is removed by grasping the handle 18 and the straws are merely dumped into the hopper so that their longitudinal axis corresponds roughly with the longitudinal axis of the hopper. In the event that the straws of the length shown in the illustrative embodiment are being used, the baffle 32 is permitted to remain inserted. In the event that longer straws are desired to be used, the baffle is removed but the function of the apparatus remains the same except that it will be necessary to adjust the rod 65 leftwardly with reference to rod 64 by movement of the collar 65A.

As the straws fall downwardly in the hopper, they are guided first by the portions 22 and 23 of walls 13 and 16 to bunch them and prepare them for entrance between the doors 37 and 38. They engage first baffle or ledge 34 and successively baffles 41, 40 and 42 as they progress downwardly in serpentine course. See FIGURE 7. The doors 37 and 38 are continually vibrated or rotated about their pivot, thus assisting them in their downward passage and orientation.

The cooperating edges 24 insure that the straws fall between doors 37 and 38 and the straws are maintained against axial travel by baffle 32 and wall 15. The cooperatingly turned ledges of doors 37 and 38 and of reservoir 39 preclude any straws escaping from the hopper assembly or reservoir. The straws, by action of doors 37 and 38, will stack as shown in FIGURE 8 in the reservoir. The offset portion 60 will permit the travel of pusher bar 67 to push the lowermost straw rightwardly with reference to FIGURES 4 and 5 from the position of FIGURES 1, 4 and 9 to that of FIGURES 5 and 10. The actuation of the solenoid to cause such is effected when the bottle B on the belt run 89 has tripped lever 98 and thus switch 91 to actuate solenoid 62. After the bottle passes the lever 98, after having had a straw inserted in it, the spring 68, upon deenergization of solenoid 62, will return the pusher bar 67 to the position of FIGURES 1, 4 and 9.

Figure 11:
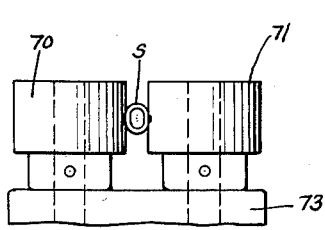
FIGURE 11 is a detailed view illustrating the passage of a straw between the gripping or feed rollers.

As the straw is moved from the position of FIGURE 4 to that of FIGURE 5, its end is passed through the aperture in wall 15 and into engagement with the rollers 70 and 71 which deform it slightly as shown in FIGURE 11 for secure frictional engagement and pass it rightwardly with reference to FIGURE 5 into the tube 81. The rollers 70 and 71 are rotated at speed sufficiently rapid to give a translatory motion or trajectory to the straw and it will follow the guide 81 downwardly and into the bottle B positioned beneath the terminal end thereof. Inertia in the straw imparted by rollers 70 and 71 develops sufficient centrifugal force, as the straw engages the curved U-shaped guide portion 83, to retain the straw against the guide. The U-shaped portion of the guide avoids any possibility of the straws jamming in the guide.

In the illustrative embodiment shown, the straws S are of sufficient length to provide an end extending approximately a half inch above the top of the bottle when inserted so that when the bottle is capped the straw will deform slightly and when the cap is removed will return to its undeformed position.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. In combination, a rectangular hopper, a pair of doors movably secured to the bottom of said hopper, said doors each being provided with inwardly extending baffles in spaced relation, means secured to said doors for vibrating them, a reservoir positioned beneath said doors, pusher means positioned to move from a first to a second position below said reservoir, bias means for returning said pusher means to initial position, means for actuating said pusher means, translating means positioned below and at one side of said reservoir to receive objects pushed by said pusher means, and a guide means positioned at the other side of said translating means having an end positioned aligned with and thereadjacent and a second end positioned at a distance therefrom.

2. In combination, a hopper having a pair of doors extending along the length of the hopper and pivoted at one edge thereto, the other edges of said doors each provided with oppositely and outwardly turned flanges, link means connecting the ends of said flanges, said doors each being provided with inwardly extending baffles in spaced relation, motor means connected to said one of said doors for pivotal movement thereof, a reservoir adjacent said flanges of said doors, said reservoir being positioned above a base member, pusher means positioned to move from a first to a second position along said base member to engage the end of a straw positioned thereon and move it lengthwise thereof, bias means for returning said pusher means to initial position, means for actuating said pusher means, gripper means positioned to receive the end of said straw as it is translated and for transferring said straw to a guide member and an arcuately extending guide member having an end positioned to receive said straw and a second end positioned spaced from said gripper means for guiding said straw from said gripper means to a predetermined location spaced therefrom.

3. The structure of claim 2 in which said arcuately extending guide member comprises a stiff tube throughout a portion of its length and a channel throughout another portion of its length.

4. In combination a rectangular hopper having a length dimension and a width dimension, a removable baffle positioned within said hopper and extending across said width dimension, a pair of doors extending substantially the length of the hopper and each pivoted at one edge thereto, said doors each having a slot to permit penetration of said baffle, means for vibrating said doors, a reservoir comprising a pair of spaced members below said doors, a base member below and supporting said reservoir, pusher means positioned to move from a first to a second position along said base member to engage the end of a straw positioned thereon and move it lengthwise thereof, bias means for returning said pusher means to first position, solenoid means for actuating said pusher, adjustable means positioned to engage a bottle positioned for insertion of a straw for actuating said solenoid, rotary cooperating gripper wheels positioned to receive the end of said straw as it is moved to said second position and for transferring said straw to a guide member, and an arcuately extending guide member having an end positioned to receive said straw and a second end positioned adjacent said adjustable means.

5. The structure of claim 4 further characterized in that said arcuately extending guide member has an end positioned in substantially horizontal extension to receive said straw, said guide member has its second end disposed in substantially vertical extension and at a lower elevation than said horizontally positioned end, said horizontal extension comprising a tubular member and said guide member comprising a downwardly and inwardly turned channel throughout its remaining portion.

6. The structure of claim 4 in which said adjustable means is a switch adjustably positioned along the line of travel of the bottle in which the straw is to be inserted for actuating said solenoid.

7. A guide member having an end disposed to receive translated straws or the like, said end being positioned in substantially horizontal extension, and a second end disposed in substantially vertical extension and at a lower elevation with reference to said horizontal end, said guide member throughout said horizontal portion comprising a tubular member and throughout its remaining portion comprising a downwardly and inwardly turned channel.

8. In combination, a hopper, a pair of doors each having an upper outwardly rolled edge positioned around a pivot rod and pivoting thereon, said pivot rods being secured to said hopper at opposite ends thereof, a lower edge of said doors being outwardly turned to provide flanges and said flanges having rolled edges each provided with a rod having ends extending therefrom, corresponding ends of said rods being secured together by a link, said rod ends penetrating arcuate slots on the walls of said hopper, motor means connected to one of said rods for pivoting said doors, each of said doors being provided with spaced baffles, at least one of the baffles on one of the doors being positioned intermediate the baffles on the other of the doors so as to provide a serpentine passageway therebetween for straws, a reservoir comprising a pair of spaced plates having outwardly turned flanges, said spaced plates extending the length of the hopper at their upper edges and having one end inwardly spaced from the hopper at their lower edges and having an offset portion to permit translation of a pusher bar, a base plate therebelow upon which straws are adapted to rest in vertical stack, a pusher bar positioned to move from first to the second position along said base plate to engage the end of a straw positioned thereon and move it lengthwise thereof, bias means for returning said pusher bar to first position, solenoid means for acuating said pusher bar, a switch adjustably positioned along the line of travel of the bottle in which a straw is to be inserted for actuating said solenoid means, a pair of gripper rollers having a smooth surface, said rollers rotating oppositely and to engage the end of a straw and to transfer it to a guide means, arcuately extending guide means having an end positioned to receive said straw and a second end positioned over said bottle for guiding said straw from said gripper means to said bottle.

9. The structure of claim 1 in which said guide chute is made up of a horizontal tubular portion for receiving a straw and a curved portion terminating in a substantially vertical portion comprising a downwardly and inwardly turned channel.

References Cited in the file of this patent

UNITED STATES PATENTS

| | | |
|---|---|---|
| 546,583 | Dennis | Sept. 17, 1895 |
| 550,310 | Woodward | Nov. 26, 1895 |
| 904,159 | Stanley et al. | Nov. 17, 1908 |
| 1,008,867 | Shee | Nov. 14, 1911 |
| 2,282,576 | Hamilton et al. | May 12, 1942 |
| 2,380,450 | Klopper | July 31, 1945 |
| 2,785,682 | Neumair | Mar. 19, 1957 |